United States Patent

[11] 3,522,761

| [72] | Inventor | Theodore J. Arneson, Jr.<br>c/o Professional Instruments Company 4601 Highway 7, Minneapolis, Minnesota 55416 |
|---|---|---|
| [21] | Appl. No. | 732,993 |
| [22] | Filed | May 29, 1968 |
| [45] | Patented | Aug. 4, 1970 |

[54] SELF THRUST BEARING STRUCTURE
5 Claims, 3 Drawing Figs.

[52] U.S. Cl. .................................................. 92/162,
92/163, 92/165, 92/168, 308/5, 308/9
[51] Int. Cl. ............................................F01b 31/00,
F16c 1/24
[50] Field of Search.......................................... 92/162,
168, 165, 166, 163; 308/5, 9; 91/51

[56] References Cited
UNITED STATES PATENTS

| 2,623,501 | 12/1952 | Audemar..................... | 92/162 |
| 3,015,315 | 1/1962 | Strimel........................ | 92/165XR |
| 3,035,879 | 5/1962 | Hanny et al.................. | 92/162XR |
| 3,053,594 | 9/1962 | Williamson................... | 92/165 |
| 3,168,013 | 2/1965 | Williamson................... | 92/168XR |
| 3,212,829 | 10/1965 | Gross .......................... | 308/9XR |
| 3,364,866 | 1/1968 | Tetsuy A Sato ............. | 308/9 |
| 3,432,213 | 3/1969 | Adams ........................ | 308/5 |

*Primary Examiner*— Martin P. Schwadron
*Assistant Examiner*— Leslie J. Payne
*Attorney*—Reif and Gregory ABSTRACT: An externally pressurized fluid bearing structure including a journal having portions of different diameter forming a shoulder therebetween having pressurized fluid bearing against said shoulder to provide an axial thrust of predetermined direction.

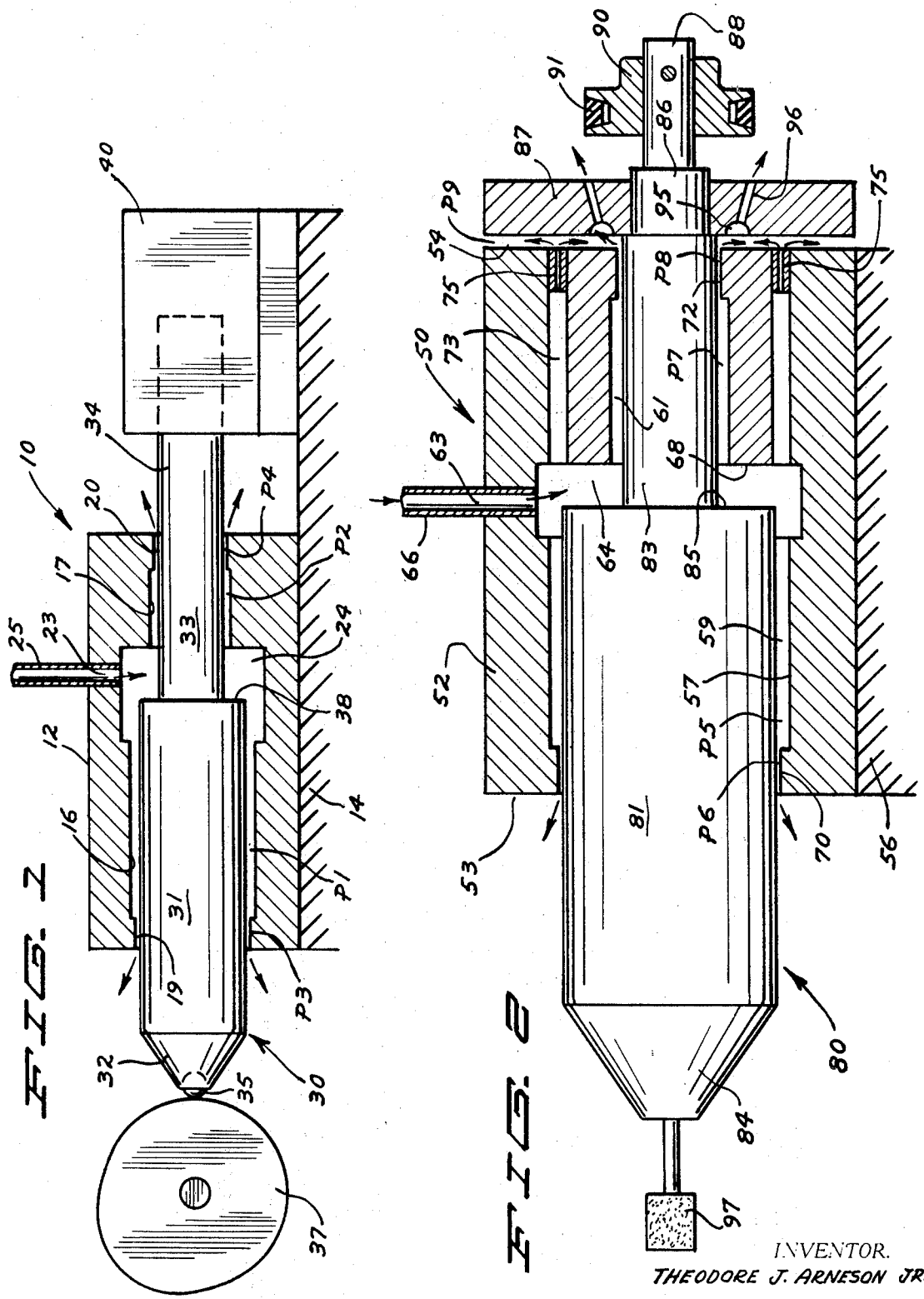

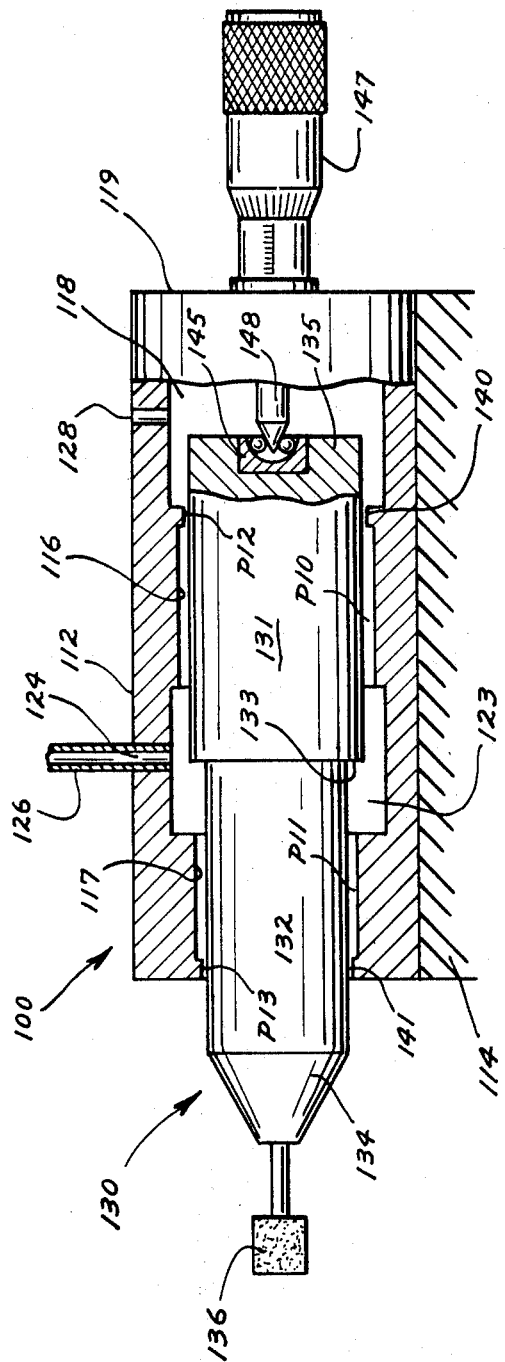

U.S. PATENT 3,522,761
SELF THRUST BEARING STRUCTURE

BACKGROUND AND SUMMARY OF THE INVENTION

In a conventional externally pressurized or hydrostatic bearing structure a thrust collar is required at either end of the journal to contain it within the bearing. The fluid supply pressure sets up an oscillating axial movement and without restraint the journal is likely to escape from the bearing.

It is desirable to provide a bearing structure which requires only a single thrust ring acting in one direction to confine the journal to the bearing. It is also desirable to have a journal structure such that in acting in one direction the work being done by the journal is utilized to confine the journal to the bearing structure. The desired structure lends itself to a substantial degree of simplicity and effectiveness in bearing design.

Generally, described, said bearing structure includes a journal having portions of different diameters disposed within the bearing of the structure whereby a shoulder is formed between said portions, a chamber about said shoulder and the adjacent portions of said shaft, means supply pressurized fluid to said chamber to bear against said shoulder to provide axial thrust in one direction, means supporting said journal within said bearing and means retaining said journal within said bearing. It will be understood that said journal within said bearing may be supported by externally pressurized fluid or by mechanical means.

It is an object of this invention therefore to provide an externally pressurized hydrostatic bearing structure embodying a journal arranged and constructed to have self axial movement in one direction only.

It is another object of this invention to provide an externally pressurized bearing structure embodying a journal having portions of different diameters forming a shoulder therebetween whereby with respect to said shoulder the supply pressure generates an axial force in one direction.

Also in view of the previous object, it is an object of this invention to provide said journal with a thrust ring, said thrust ring being required to retain said journal with respect to one direction only.

More specifically, it is an object of this invention to provide an externally pressurized bearing structure comprising a bearing having a chamber therein, a journal extending through said chamber, said journal having portions within said chamber of different diameters forming a shoulder on said journal and an externally pressurized fluid supply into said chamber bearing on said shoulder.

These and other objects and advantages of the invention will be set forth in the following description made in connection with the accompanying drawings in which like reference characters refer to similar parts throughout the several views and in which:

FIGURE 1 is a view in vertical cross section and partially diagrammatic showing an embodiment of the invention herein;

FIGURE 2 is a view similar to FIG. 1 showing a modification thereof; and

FIG. 3 is also a view substantially similar to FIG. 1, showing another modification thereof and showing some portions thereof broken away.

DESCRIPTION OF A PREFERRED EMBODIMENT

With reference to the drawings, a preferred embodiment of the structure herein comprising an externally pressurized bearing structure is indicated generally by the number 10 and comprises a bearing housing 12 supported on a suitable base 14. Said housing may take on any desirable outer configuration and is here indicated as being substantially rectangular in cross section.

Within said housing is a bore 16 forming a cylindrical chamber and extending rearwardly thereof is a bore 17 of reduced diameter forming a second chamber.

Annular steps or lands 19 and 20 are formed respectively at the outer ends of said chambers 16 and 17.

A passage 23 through the wall of said housing forms an inlet for communication therein with an annular groove or supply chamber 24 disposed between said bores 16 and 17. A line 25 runs from the passage 23 to a suitable pressurized fluid supply.

Disposed within said bearing is a shaft 30 having a cylindrical body or journal portion 31 disposed into and extending partially out of said chamber 16. A portion of said journal 31 extends into said supply chamber 24. An exterior end portion 32 of said shaft shown having a conical terminal portion is indicated as having a ball 35 forming a bearing partially received and rotatably secured in a conventional manner within the apex thereof. This is by way of showing one application of said shaft which for purpose of illustration is here shown being applied as a follower for a cam wheel 37 which is indicated schematically.

Said shaft has an extended body or journal portion 33 of a lesser diameter having a portion thereof disposed within said supply chamber 24 and major portion thereof extending into and through the chamber 17 and having an outwardly extending portion 34. Formed on the inner end of said shaft portion 31 by the reduction in diameter of the shaft portion 33 is an annular shoulder 38 which may be right-angled as shown or inclined, with reference to axis of the shaft.

Said shaft portion 31 preferably will have a radial clearance on the order of .0004 inch with respect to the chamber 16 and the shaft portion 33 will have a like clearance with respect to the chamber 17. Said shaft portions 31 and 33 will have radial clearances respectively on the order of .0002 inch with regard to the terminal land or step portions 19 and 20. The passages thus formed are designated respectively as P1, P2, P3 and P4.

The extended end portion 34 of said shaft is here shown arranged to be operatively engaged by means to drive said shaft 30. By way of example, schematically, a device 40 such as a transducer is indicated and said shaft 30 operates in connection therewith. The voltage transmitted, as an example of work being done, may be made dependent upon the linear position of said shaft 30 as determined by the configuration and movement of the cam wheel 37.

OPERATION

The structure above described with the shaft 30 having portions of different diameters within the chamber 16 is arranged to have self axial movment in the direction of the cam wheel 37. The self axial movement is responsive to the inlet supply of externally pressurized fluid bearing on the annular shoulder 38. Also said fluid in connection with the passages P1, P2, P3 and P4 serves to radially center the shaft. The radial centering of the shaft is known in the externally pressurized bearing art. The passages P3 and P4 are determined to have a sufficently restrictive clearance to provide pressure differential which results in centering action with respect to the shaft.

The axial thrust force of the shaft can be calculated in view of the pressure of the fluid supply with respect to the area of said shoulder 38 to predetermine such force. With the fluid supply under a constant pressure, there will be a substantially constant axial force exerted. This is regarded as representing a more constant force than may be attained with the use of mechanical means.

In the application here presented, a thrust or collar ring is not required as the cam wheel as a cooperating tool or piece of apparatus provides the necessary restraint to retain the shaft within linear operating limits in operating position within the bearing housing. The apparatus or device 40 may also serve to retain the shaft operatively within the chamber 16 by having the shaft operatively secured thereto.

The axial movement of the shaft is substantially frictionless, the pressure is uniform and the structure is one of great simplicity and efficiency.

There are many appropriate applications for the structure where a pressure uniform to a high degree of accuracy is desirable.

MODIFICATION

A modification of the structure above described is shown in FIG. 2 and is indicated generally by the reference number 50. Said modified structure comprises a bearing housing 52 having end walls 53 and 54 and being supported on an appropriate base 56. Said housing is indicated as being cylindrical in form but may take on any desirable outer configuration.

Said housing has a cylindrical bore 57 therethrough forming a first or primary chamber 59 and a second or secondary chamber 61 having a lesser diameter than said first chamber.

A transverse passage 63 through said housing extends to an annular internal groove 64 within said chamber 59 at its inner end portion and is shown adjacent said second chamber 61. Said passage 63 forms an inlet and a line 66 runs therefrom to a suitable pressurized supply of fluid.

At the inner end of said chamber 61 is an annular wall 68. At the outer end portion of said chamber 59 is a radially extending annular step or land 70 and at the outer end portion of said chamber 61 is a similar annular step or land 72. Said steps or lands will be further described.

Extending from said annular wall 68 and spaced radially about said chamber 61 are a plurality of circumferentially spaced passages 73 running to the end wall 54 of said housing 52. Said passages at their end portions adjacent said wall 54 are reduced to have restrictive orifices 75.

Disposed within said housing 50 is a shaft 80 having a portion 81 extending into the chamber 59 and partially into the annular supply chamber 64. Said shaft has a portion 83 of reduced diameter extending from said supply chamber 64, through said chamber 61 and outwardly of said housing and having extended portions 86 and 88 of successively reduced diameters.

Formed at the inner end of said shaft portion 81 is an annular shoulder 85.

Said shaft portion 81 has a portion extending outwardly of said end wall 53 having a tapered terminal portion 84 carrying a working tool 97 here shown as a grinder.

Said shaft portions or journals 81 and 83 will each have a diameter such as to provide a radial clearance on the order of .0004 inch respectively with regard to the diameters of the chambers 59 and 61 and forming thereby the respective annular restricted passages P5 and P7. Said shaft portions will have radial clearances respectively with the steps 70 and 72 on the order of .0002 inch and forming thereby the annular further restrictive passages P6 and P8. The clearances indicated are merely to be regarded as preferable working clearances for radially centering the shaft 80 in a manner known in the art.

Said shaft portion 86 of reduced diameter forms a threaded boss onto which is mounted a circular plate member 87 centrally tapped to be threaded onto said boss to form a thrust plate. The further extended portion 88 of said shaft 80 shown having a further reduced diameter is indicated as carrying a pulley 90 having a driving belt 91 pass thereover. Said pulley is shown by way of illustration as one way in which said shaft 80 may be driven. It will be understood that said thrust plate 87 may be adapted to serve also as a pulley in lieu of a separate pulley member.

Between said thrust plate 87 and the adjacent end wall 54 is an annular passage P9. Extending about the central portion of the inner face of said thrust plate is an annular groove 95 and extending therefrom transversely through said thrust plate are a plurality of circularly spaced outlet or exhaust passages 96.

OPERATION

The modification above described operates in the manner of the structure first above described.

The incoming pressurized fluid bearing against the area of the shoulder 85 provides thrust to urge said shaft 80 in a direction to the left as viewed in the drawing and thus applying pressure for the work to be done by the grinder 97. A very precise and constant thrust force may be developed as is known, the thrust force developed is determined by the pressure of the fluid supplied with respect to the area of said shoulder 85. Thus by regulating the feeding pressure of the fluid, the axial force is precisely determined and controlled.

The single thrust plate 87 locates the shaft in the bearing structure.

The annular passage P9 acts as a restrictive area for the fluid passing through the orifices 75. With the fluid supplied being under a constant or regulated pressure, the thrust plate is stabilized in positions and thus accurately locates and positions the shaft.

The fluid supplied in passing through the annular passage P5-P6 and P7-P8 radially centers the shaft in a manner known in the art. From the passage P8, the fluid exhausted passes to the atmosphere through the passages 96.

Thus by means of a relatively simple structure, a very high degree of accuracy in the determination of the axial thrust and the axial positioning of a shaft may be attained.

MODIFICATION

With reference to FIG. 3, another modification of the invention herein is shown, being indicated generally by the reference numeral 100 and comprising a bearing housing 112 supported on a suitable base 114. Said housing may take on any desirable outer configuration and is here indicated as being substantially cylindrical.

As shown here, formed substantially centrally axially of said housing is a chamber 116 and extending forwardly thereof to adjacent one end of said housing is a second chamber 117 of reduced diameter. Extending rearwardly of said chamber 116 is a third chamber 118 which has an outer end wall 119.

Formed between said chamber 116 and said chamber 117 is an annular supply chamber 123 having a transverse inlet passage 124 having a supply line connected thereto extending to a suitable pressurized fluid supply.

Said chamber 118 is shown having an outlet passage 128 to the atmosphere.

Disposed within said housing is a shaft 130. The inner end portion 131 of said shaft is disposed for the most part within the chamber 116 and extends forwardly partially into the chamber 118 and also extends partially into the chamber 123. Extending forwardly of said portion 131 is the portion 132 of said shaft of reduced diameter extending outwardly of the end wall 120 of said housing. Said outwardly extending portion has a tapered terminal portion 134 which is here shown carrying in a conventional manner a working tool 136 which for purpose of illustration is indicated as being a grinder. An annular shoulder 133 is formed between the shaft portions 131 and 132.

Said shaft portions 131 and 132 are each of a diameter such as to provide radial clearances on the order of .0004 inch with their respective chambers 116 and 117, and thus form the annular passages P10 and P11.

At the ends of said chambers 131 and 132 remote from one another are annular land or step portions 140 and 141 which respectively provide a clearance on the order of .0002 inch with their respective adjacent shaft portions and thus respectively form annular passages P12 and P13. The dimensions given are to be regarded as suitable operating dimensions or clearances.

Embedded centrally within the inner end portion 135 of said shaft is a conventional centering ball thrust bearing 145.

Mounted in a suitable manner on the end wall of said housing is an adjustable means 147 for axially locating the shaft and by way of illustration it is shown as a micrometer having its tapered spindle 148 seated within said bearing 145.

OPERATION

The modified structure 100 just described operates in a manner not unlike the structures 10 and 50 above described and from their description it is believed it operation will be understood. This modified structure however embodies the use of the mechanical means to position the shaft with respect to work it is to perform. It will be noted that axial thrust is generated to cause the shaft to bear against said micrometer 147. Thus the shaft may very readily have its position altered as may be desired with respect to work being done. The shaft is held constant by the thrust generated and axial adjustment of the shaft easily and accurately accomplished.

Driving means for the shaft 130 are not here shown but such means may be applied in a conventional manner such as mechanical or electrical means or the pressurized fluid supporting the bearing may be utilized for this purpose by adding conventional vanes or flutes to the shaft structure.

Thus it is seen that there has been provided a simple and effective bearing structure arranged for a constant and uniform self axial thrust in a given direction.

Although not here shown, it will be understoood that conventional mechanical means for support of the journal within the bearing is within the scope of the invention herein.

I claim:
1. A directional self thrust bearing having in combination,
   a housing comprising a bearing,
   a shaft journaled within said bearing, said shaft having portion thereof of greater transverse dimension and a portion of lesser transverse dimension and a shoulder formed therebetween,
   said bearing
   comprising a restrictive passage about each of said portions of said shaft and conforming to said shaft,
   said bearing forming at each end thereof further restrictive passages about said shaft,
   an annular groove within said bearing about the shoulder portion of said shaft and having sufficient length to accommodate axial movement of said shoulder portion,
   said annular groove forming an unrestricted inlet supply chamber in open communication with said restrictive and further restrictive passages and forming an unrestricted clearance portion about said shoulder portion of said shaft,
   means supplying pressurized fluid to said annular groove and therefrom through said restrictive and further restrictive passages to support said shaft within said bearing for rotative and axial movement thereof, and
   said fluid bearing against said shoulder providing thrust force for directional axial movement of said shaft.
2. The structure set forth in claim 1, wherein
   said shoulder is disposed in a plane normal to the axis of said shaft.
3. The structure set forth in claim 1, wherein
   said shaft is cylindrical and said restrictive and further restrictive passages form annular passages thereabout.
4. The structure set forth in claim 1, including
   a plurality of exhaust passages running from said inlet supply chamber to the end of said housing spaced about the portion of said restrictive and further restrictive passages about the portion of said shaft of lesser transverse dimension,
   said exhaust passages having further restrictive passages therein adjacent the end portion of said housing,
   the end portion of said lesser transversely dimensioned portion of said shaft extending axially outwardly of said housing,
   a thrust plate member carried by said extended portion of said shaft forming a restricted passage with the adjacent end portion of said housing, and
   means carried by said extended end portion of said shaft for driving said shaft.
5. The structure set forth in claim 1, including
   means carried by said housing limiting the axial movement of said shaft oppositely the direction of the axial movement of said shaft by said fluid bearing against said shoulder.